(12) United States Patent
Yang et al.

(10) Patent No.: US 12,739,081 B2
(45) Date of Patent: Sep. 15, 2026

(54) SOUNDING REFERENCE SIGNAL RESOURCE SET CONFIGURATIONS

(71) Applicant: QUALCOMM Incorporated, San Diego, CA (US)

(72) Inventors: Wei Yang, San Diego, CA (US); Alexandros Manolakos, Escondido, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 365 days.

(21) Appl. No.: 18/565,863

(22) PCT Filed: Jul. 27, 2022

(86) PCT No.: PCT/US2022/074211
§ 371 (c)(1),
(2) Date: Nov. 30, 2023

(87) PCT Pub. No.: WO2023/015123
PCT Pub. Date: Feb. 9, 2023

(65) Prior Publication Data

US 2024/0267186 A1 Aug. 8, 2024

(30) Foreign Application Priority Data

Aug. 6, 2021 (GR) .............................. 20210100541

(51) Int. Cl.
*H04L 5/00* (2006.01)

(52) U.S. Cl.
CPC .................................. *H04L 5/0051* (2013.01)

(58) Field of Classification Search
CPC ..... H04L 1/1642; H04L 47/34; H04L 1/1607; H04L 41/0896; H04L 41/147;
(Continued)

(56) References Cited

U.S. PATENT DOCUMENTS

| | | | | |
|---|---|---|---|---|
| 12,250,702 B2 * | 3/2025 | Wu | ........................ | H04L 5/0048 |
| 2019/0174466 A1 * | 6/2019 | Zhang | ................... | H04L 5/0057 |

(Continued)

FOREIGN PATENT DOCUMENTS

| | | | | |
|---|---|---|---|---|
| CN | 111092708 A | 5/2020 | | |
| EP | 3989656 A1 * | 4/2022 | ........... | H04B 7/0604 |

(Continued)

OTHER PUBLICATIONS

3GPP TS 38.214, "3rd Generation Partnership Project; Technical Specification Group Radio Access Network; NR; Physical Layer Procedures for Data (Release 15)", 3GPP Standard, Technical Specification, 3GPP TS 38.214, 3rd Generation Partnership Project (3GPP), Mobile Competence Centre, 650, Route Des Lucioles, F-06921 Sophia-Antipolis Cedex, France, No. V15.5.0, Mar. 27, 2019 (Mar. 27, 2019), pp. 1-103, XP051722951, Sections 6.2.1, 6.1.1.2.

(Continued)

*Primary Examiner* — Nathan S Taylor
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network entity, a first sounding reference signal (SRS) resource set configuration that indicates a first set of parameters. The UE may receive, from the network entity, a second SRS resource set configuration with a same usage as the first SRS resource set configuration that indicates a second set of parameters, wherein a subset of parameters are different between the first set of parameters and the second set of parameters. Numerous other aspects are described.

30 Claims, 10 Drawing Sheets

(58) Field of Classification Search

CPC . H04L 41/16; H04L 41/5006; H04L 41/5009; H04L 41/5019; H04L 43/0876; H04L 43/0882; H04W 28/06; H04W 28/082; H04W 28/0865; H04W 28/09; H04W 76/15; H04W 88/06; H04W 56/0045; H04W 56/00; H04W 56/0015; H04W 56/0065; H04W 28/0263; H04W 28/0268; H04W 28/20; H04W 28/24; H04W 28/02; H01L 21/6875; H01L 21/687; H01L 21/027; H01L 21/304; H01L 21/67; H01L 21/683; G03F 7/707; G03F 7/70975; G03F 7/7095; G03F 7/00; G03F 7/20

See application file for complete search history.

(56) References Cited

U.S. PATENT DOCUMENTS

2019/0281588 A1* 9/2019 Zhang .................. H04W 52/08
2019/0349964 A1* 11/2019 Liou .................. H04W 72/046
2020/0112970 A1* 4/2020 Manolakos ........... H04L 5/0064
2020/0228190 A1* 7/2020 Cirik ..................... H04L 5/0048
2020/0252241 A1* 8/2020 Park .................... H04L 25/0224
2021/0006370 A1* 1/2021 Sun ..................... H04W 52/146
2021/0135816 A1* 5/2021 Davydov ............. H04L 5/0091
2022/0045806 A1* 2/2022 Cirik ..................... H04L 1/1887
2022/0210667 A1* 6/2022 Fan ....................... H04L 5/0053
2022/0232535 A1* 7/2022 Abdelghaffar ........ H04L 5/0091
2022/0256519 A1* 8/2022 Jeon ...................... G01S 7/0235
2022/0271815 A1* 8/2022 Zhang .................. H04B 7/0404
2022/0337373 A1* 10/2022 Wu ....................... H04L 5/0028
2022/0338190 A1* 10/2022 Wu ....................... H04W 72/23
2022/0353042 A1* 11/2022 Gao ..................... H04B 7/0602
2022/0353698 A1* 11/2022 Jang ........................ H04L 1/189
2022/0408468 A1* 12/2022 Jang .................. H04W 72/1273
2023/0017408 A1* 1/2023 Levitsky ............... H04L 5/0048
2023/0045308 A1* 2/2023 Guan ................... H04B 7/0608
2023/0122786 A1* 4/2023 Bang ................... H04W 72/232
370/329
2023/0124582 A1* 4/2023 Frenne .................. H04W 72/23
370/329
2023/0388076 A1* 11/2023 Yokomakura ......... H04L 5/0048
2023/0388080 A1* 11/2023 Hindy .................. H04B 7/0482
2023/0403118 A1* 12/2023 Xiao ..................... H04L 5/0094
2024/0008024 A1* 1/2024 Jung ..................... H04L 1/1812
2024/0121623 A1* 4/2024 Matsumura ....... H04W 72/1273
2024/0214947 A1* 6/2024 Park ...................... H04L 5/0053
2024/0214954 A1* 6/2024 Lim ...................... H04W 52/42
2024/0223254 A1* 7/2024 Hindy .................... H04B 7/063
2024/0373372 A1* 11/2024 Gao ...................... H04W 72/21
2025/0008512 A1* 1/2025 Jang .......................... H04L 1/08
2025/0048357 A1* 2/2025 Cirik ..................... H04L 5/0094
2026/0031892 A1* 1/2026 Park ................... H04B 7/06968

FOREIGN PATENT DOCUMENTS

EP 3998793 A1 * 5/2022 ........... H04B 7/0608
EP 4280643 A1 * 11/2023 ........... H04B 7/0628
EP 4329234 A2 * 2/2024 ........ H04W 72/0453
EP 4021095 B1 * 4/2024 ........... H04L 5/0051
EP 4654715 A2 * 11/2025 ........... H04L 5/0023
WO WO-2020056180 A1 * 3/2020 ........... H04L 5/0051
WO 2021090369 A1 5/2021
WO WO-2021151394 A1 * 8/2021 ........... H04L 5/0048
WO WO-2021229537 A1 * 11/2021 ........... H04L 5/0012
WO WO-2022031427 A1 * 2/2022 ........... H04L 5/0023
WO WO-2022241340 A1 * 11/2022 ............... H04B 7/01
WO 2023007670 A1 2/2023

OTHER PUBLICATIONS

International Search Report and Written Opinion—PCT/US2022/074211—ISA/EPO—Oct. 28, 2022.

3GPP: "3rd Generation Partnership Project, Technical Specification Group Radio Access Network, NR, Radio Resource Control (RRC) protocol specification (Release 16)", 3GPP TS 38.331 V16.5.0, Jun. 2021, Jun. 7, 2021, pp. 1-956, p. 643-654.

* cited by examiner 200
120
284
130
110
Data Sink
Memory
Data Source
Receive Processor
Controller/ Processor
Transmit Processor
MIMO Detector
Comm. Manager
TX MIMO Processor
DEMOD
MOD
260
282
262
258
280
264
256
140
266
254a
254r
252a
252r
234a
234t
232a
232t
230
246
150
236
220
240
238
212
244
242
239
292
290
294
Scheduler
Comm. Mgr
Comm Unit

300

```
SRS-Config ::=                      SEQUENCE {
   srs-ResourceSetToAddModList      SEQUENCE (SIZE(1..maxNrofSRS-ResourceSets)) OF SRS-ResourceSet
   srs-ResourceToReleaseList        SEQUENCE (SIZE(1..maxNrofSRS-Resources)) OF SRS-ResourceId
   srs-ResourceToAddModList         SEQUENCE (SIZE(1..maxNrofSRS-Resources)) OF SRS-Resource
   tpc-Accumulation                 ENUMERATED {disabled}

   ...,

   srs-ResourceSetToAddModListForDCI-Format0-2-r16 SEQUENCE (SIZE(1..maxNrofSRS-ResourceSets)) OF SRS-ResourceSet
   srs-ResourceSetToReleaseListForDCI-Format0-2-r16 SEQUENCE (SIZE(1..maxNrofSRS-ResourceSets)) OF SRS-ResourceSetId
   srs-PosResourceSetToReleaseList-r16     SEQUENCE (SIZE(1..maxNrofSRS-PosResourceSets-r16)) OF SRS-PosResourceSetId-r16
```

```
SRS-ResourceSet ::=                SEQUENCE {
  srs-ResourceSetId                  SRS-ResourceSetId,
  srs-ResourceIdList                 SEQUENCE (SIZE(1..maxNrofSRS-ResourcesPerSet)) OF SRS-ResourceId
  resourceType                       CHOICE {
    aperiodic                        SEQUENCE {
      aperiodicSRS-ResourceTrigger          INTEGER (1..maxNrofSRS-TriggerStates-1),
      csi-RS                         NZP-CSI-RS-ResourceId                        OPTIONAL, -- Cond NonCodebook
      slotOffset                     INTEGER (1..32)
      ...,

      aperiodicSRS-ResourceTriggerList          SEQUENCE (SIZE(1..maxNrofSRS-TriggerStates-2))
                                       OF INTEGER (1..maxNrofSRS-TriggerStates-1)

    semi-persistent                  SEQUENCE {
      associatedCSI-RS                   NZP-CSI-RS-ResourceId                        OPTIONAL, -- Cond NonCodebook
      ...

    periodic                         SEQUENCE {
      associatedCSI-RS                   NZP-CSI-RS-ResourceId                        OPTIONAL, -- Cond NonCodebook
      ...

  usage                            ENUMERATED {beamManagement, codebook, nonCodebook, antennaSwitching},
  alpha                            Alpha
  p0                               INTEGER (-202..24)
  pathlossReferenceRS                  PathlossReferenceRS-Config
  srs-PowerControlAdjustmentStates       ENUMERATED { sameAsFci2, separateClosedLoop}

  pathlossReferenceRS-List-r16         SEQUENCE (SIZE(1..maxNrofSRS-PathlossReferenceRS-r16-1)) OF PathlossReferenceRS-Config
```

FIG. 4

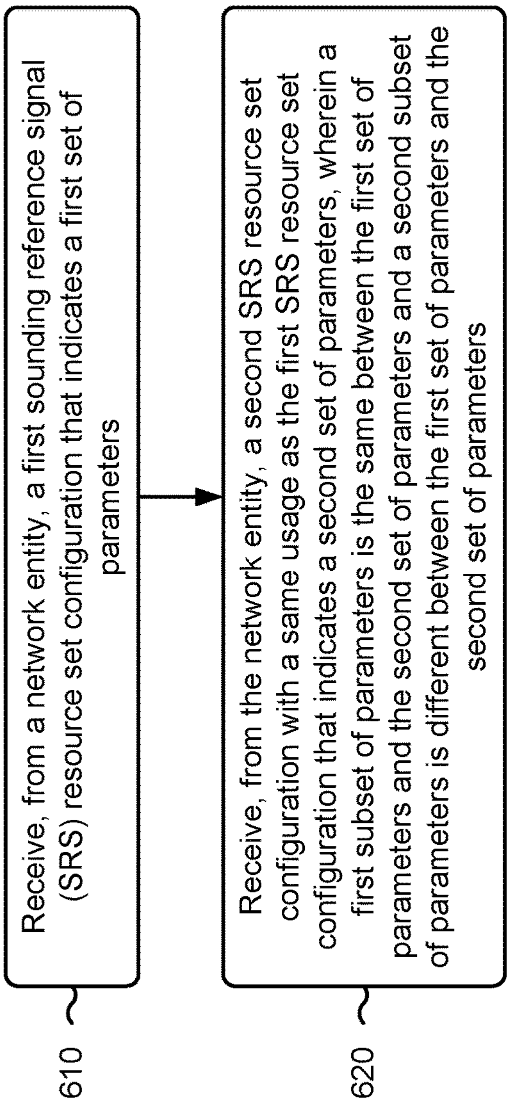
FIG. 6

700

SOUNDING REFERENCE SIGNAL RESOURCE SET CONFIGURATIONS

CROSS-REFERENCE TO RELATED APPLICATIONS

This Patent Application is a 371 national stage of PCT Application No. PCT/US2022/074211 filed on Jul. 27, 2022, entitled "SOUNDING REFERENCE SIGNAL RESOURCE SET CONFIGURATIONS," which claims priority to Greek patent application No. 20210100541, filed on Aug. 6, 2021, entitled "SOUNDING REFERENCE SIGNAL RESOURCE SET CONFIGURATIONS." The disclosure of the prior Applications are considered part of and are hereby expressly incorporated by reference in this Patent Application.

FIELD OF THE DISCLOSURE

Aspects of the present disclosure generally relate to wireless communication and to techniques and apparatuses for sounding reference signal (SRS) resource set configurations.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory and one or more processors, coupled to the memory, configured to: receive, from a network entity, a first sounding reference signal (SRS) resource set configuration that indicates a first set of parameters; and receive, from the network entity, a second SRS resource set configuration with a same usage as the first SRS resource set configuration that indicates a second set of parameters, wherein a subset of parameters are different between the first set of parameters and the second set of parameters.

In some implementations, an apparatus for wireless communication at a network entity includes a memory and one or more processors, coupled to the memory, configured to: transmit, to a UE, a first SRS resource set configuration that indicates a first set of parameters; and transmit, to the UE, a second SRS resource set configuration with a same usage as the first SRS resource set configuration that indicates a second set of parameters, wherein a first subset of parameters is the same between the first set of parameters and the second set of parameters, and a second subset of parameters is different between the first set of parameters and the second set of parameters.

In some implementations, a method of wireless communication performed by a UE includes receiving, from a network entity, a first SRS resource set configuration that indicates a first set of parameters; and receiving, from the network entity, a second SRS resource set configuration with a same usage as the first SRS resource set configuration that indicates a second set of parameters, wherein a first subset of parameters is the same between the first set of parameters and the second set of parameters, and a second subset of parameters is different between the first set of parameters and the second set of parameters.

In some implementations, a method of wireless communication performed by a network entity includes transmitting, to a UE, a first SRS resource set configuration that indicates a first set of parameters; and transmitting, to the UE, a second SRS resource set configuration with a same usage as the first SRS resource set configuration that indicates a second set of parameters, wherein a first subset of parameters is the same between the first set of parameters and the second set of parameters, and a second subset of parameters is different between the first set of parameters and the second set of parameters.

In some implementations, a non-transitory computer-readable medium storing a set of instructions for wireless communication includes one or more instructions that, when executed by one or more processors of a UE, cause the UE to: receive, from a network entity, a first SRS resource set configuration that indicates a first set of parameters; and receive, from the network entity, a second SRS resource set configuration with a same usage as the first SRS resource set configuration that indicates a second set of parameters, wherein a first subset of parameters is the same between the first set of parameters and the second set of parameters, and a second subset of parameters is different between the first set of parameters and the second set of parameters.

In some implementations, a non-transitory computer-readable medium storing a set of instructions for wireless communication includes one or more instructions that, when executed by one or more processors of a network entity, cause the network entity to: transmit, to a UE, a first SRS resource set configuration that indicates a first set of parameters; and transmit, to the UE, a second SRS resource set configuration with a same usage as the first SRS resource set configuration that indicates a second set of parameters, wherein a first subset of parameters is the same between the first set of parameters and the second set of parameters, and a second subset of parameters is different between the first set of parameters and the second set of parameters.

In some implementations, an apparatus for wireless communication includes means for receiving, from a network entity, a first SRS resource set configuration that indicates a first set of parameters; and means for receiving, from the network entity, a second SRS resource set configuration with a same usage as the first SRS resource set configuration that indicates a second set of parameters, wherein a first subset of parameters is the same between the first set of parameters and the second set of parameters, and a second subset of parameters is different between the first set of parameters and the second set of parameters.

In some implementations, an apparatus for wireless communication includes means for transmitting, to a UE, a first SRS resource set configuration that indicates a first set of parameters; and means for transmitting, to the UE, a second SRS resource set configuration with a same usage as the first SRS resource set configuration that indicates a second set of parameters, wherein a first subset of parameters is the same between the first set of parameters and the second set of parameters, and a second subset of parameters is different between the first set of parameters and the second set of parameters.

Aspects generally include a method, apparatus, system, computer program product, non-transitory computer-readable medium, user equipment, network entity, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3 is a diagram illustrating an example of a sounding reference signal (SRS) configuration, in accordance with the present disclosure.

FIG. 4 is a diagram illustrating an example of an SRS resource set, in accordance with the present disclosure.

FIGS. 6-7 are diagrams illustrating example processes associated with SRS resource set configurations, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
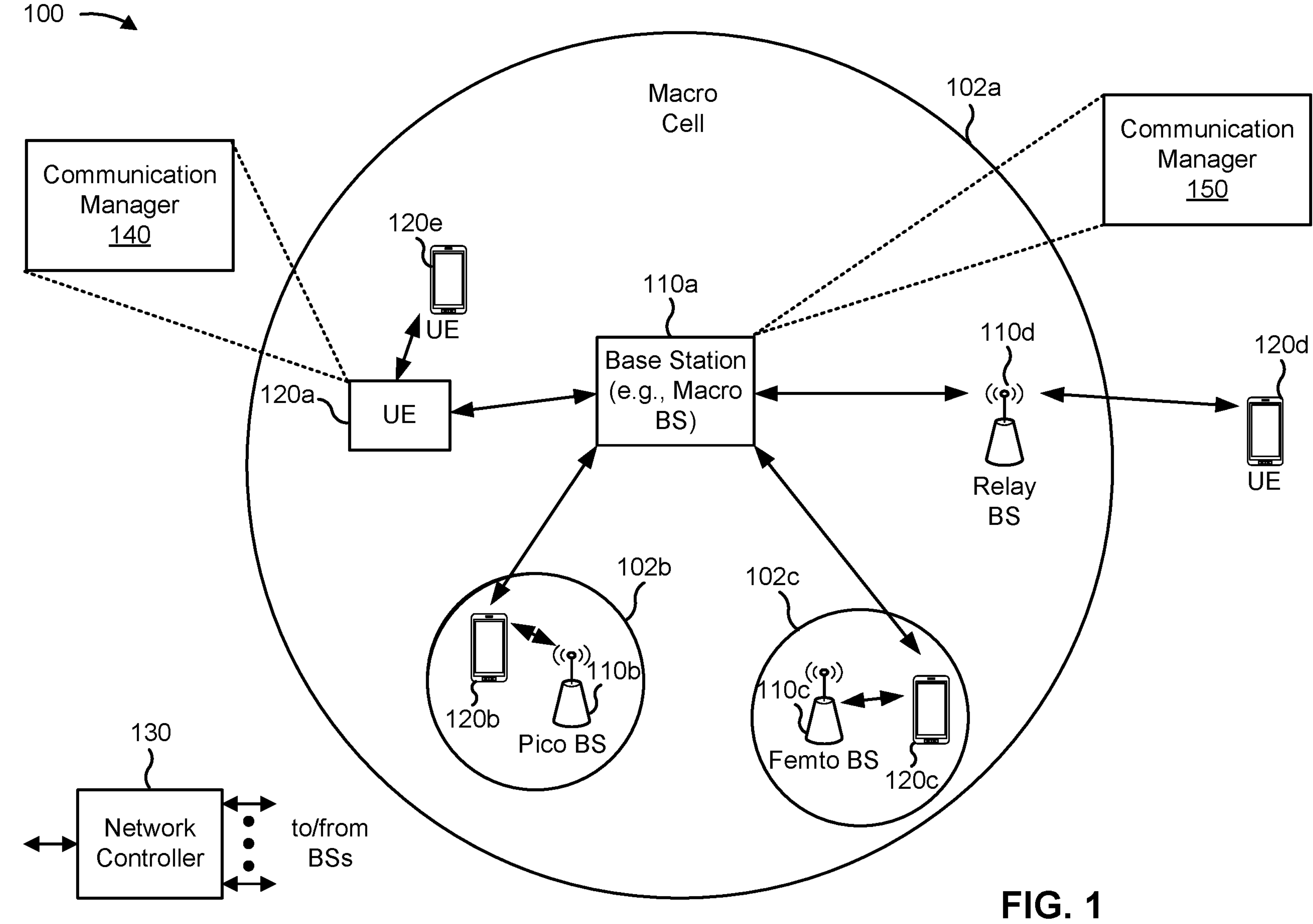
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive, from a network entity, a first SRS resource set configuration that indicates a first set of parameters; and receive, from the network entity, a second SRS resource set configuration with a same usage as the first SRS resource set configuration that indicates a second set of parameters, wherein a first subset of parameters is the same between the first set of parameters and the second set of parameters, and a second subset of parameters is different between the first set of parameters and the second set of parameters. Additionally, or alternatively, the communication manager 140 may perform one or more other operations described herein.

In some aspects, a network entity (e.g., base station 110) may include a communication manager 150. As described in more detail elsewhere herein, the communication manager 150 may transmit, to a UE, a first SRS resource set configuration that indicates a first set of parameters; and transmit, to the UE, a second SRS resource set configuration with a same usage as the first SRS resource set configuration that indicates a second set of parameters, wherein a first subset of parameters is the same between the first set of parameters and the second set of parameters, and a second subset of parameters is different between the first set of parameters and the second set of parameters. Additionally, or alternatively, the communication manager 150 may perform one or more other operations described herein.

As indicated above, FIG. 1 is provided as an example. Other examples may differ from what is described with regard to FIG. 1.

Figure 2:
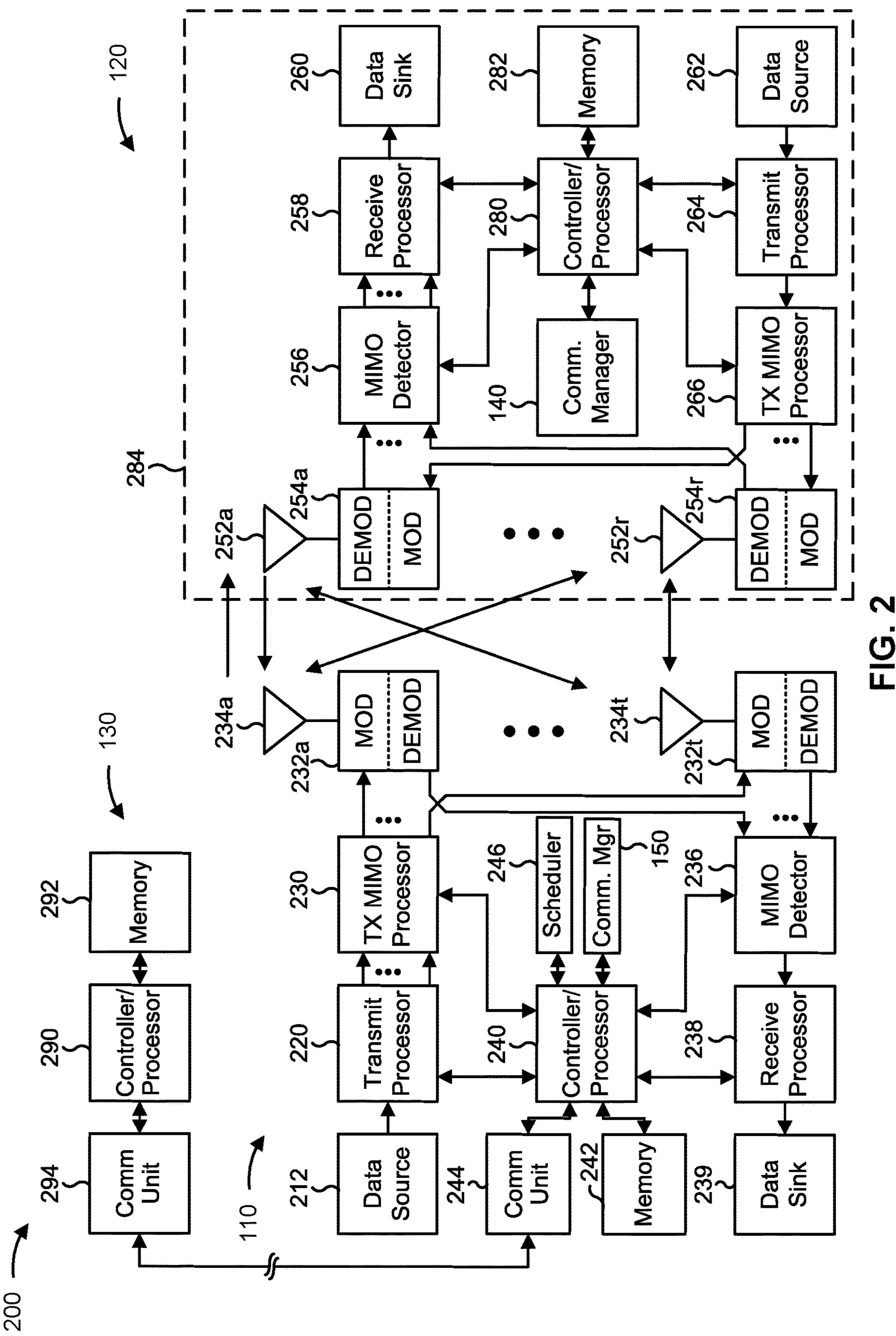
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the base station 110, the controller/processor 280 of the UE 120, and/or any other component(s) of FIG. 2 may perform one or more techniques associated with SRS resource set configurations, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, from a network entity, a first SRS resource set configuration that indicates a first set of parameters; and/or means for receiving, from the network entity, a second SRS resource set configuration with a same usage as the first SRS resource set configuration that indicates a second set of parameters, wherein a first subset of parameters is the same between the first set of parameters and the second set of parameters, and a second subset of parameters is different between the first set of parameters and the second set of parameters. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., base station 110) includes means for transmitting, to a UE, a first SRS resource set configuration that indicates a first set of parameters; and/or means for transmitting, to the UE, a second SRS resource set configuration with a same usage as the first SRS resource set configuration that indicates a second set of parameters, wherein a first subset of parameters is the same between the first set of parameters and the second set of parameters, and a second subset of parameters is different between the first set of parameters and the second set of parameters. The means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Downlink control information (DCI) format 0_2 and DCI format 1_2 may be compact DCI formats that support ultra-reliable low-latency communication (URLLC). DCI format 0_2 and DCI format 1_2 may have a smaller size than regular scheduling DCI (e.g., DCI format 0_1 and DCI format 1_1) by having a configurable bit width for each DCI field. DCI format 0_2 may include a sounding reference signal (SRS) resource indicator (SRI) field, which may have a configurable size that is different from an SRI field in DCI format 0_1. The bit width of the SRI field in DCI format 0_2 may be based at least in part on a quantity of SRS resources in an "SRS resource set to add or modify list in DCI format 0_2" (srs-ResourceSetToAddModListDCI-0-2-r16) parameter, which may be a radio resource control (RRC) parameter. The srs-ResourceSetToAddModListDCI-0-2-r16 parameter may configure new SRS resource sets for a usage of "codebook" or "non-codebook", which may be in addition to SRS resource sets configured via an srs-ResourceSetToAddModList parameter. However, the new SRS resource sets configured in the srs-ResourceSetToAddModListDCI-0-2-r16 parameter may increase a UE processing burden, since in previous designs, the UE could only support at most one SRS resource set with a usage set to "codebook" and one SRS resource set with a usage set to "non-codebook".

An SRS resource set may be configured to have a usage of "codebook" or "non-codebook", and a precoder may be applied on a physical uplink shared channel (PUSCH) depending on whether the SRS resource set is configured to have the usage of "codebook" or "non-codebook". For the usage of "codebook", precoders may be selected from a fixed set, and an SRS may be transmitted unprecoded from the UE to a network entity (e.g., a base station). For the usage of "non-codebook," the UE may determine a set of precoders using a channel state information reference signal (CSI-RS) and channel reciprocity, and the UE may apply the set of precoders on the SRS transmitted to the network entity. The network entity may select a precoder based at least in part on a measurement associated with the SRS received from the UE.

FIG. 3 is a diagram illustrating an example 300 of an SRS configuration, in accordance with the present disclosure.

As shown in FIG. 3, the SRS configuration may include an RRC configuration associated with two SRS resource set(s). The SRS configuration may include an srs-ResourceSetToAddModList parameter, which may have a size ranging from a numerical value of one to a numerical value associated with a maximum quantity of SRS resource sets (maxNrofSRS-ResourceSets). The srs-ResourceSetToAddModList parameter may be associated with first SRS resource set(s). The SRS configuration may include an srs-ResourceSetToAddModListDCI-0-2-r16 parameter, which may have a size ranging from a numerical value of one to a numerical value associated with maxNrofSRS-ResourceSets. The srs-ResourceSetToAddModListDCI-0-2-r16 parameter may indicate a list of SRS resource sets to be added or modified for DCI format 0_2. The srs-ResourceSetToAddModListDCI-0-2-r16 parameter may be associated with second SRS resource set(s).

As indicated above, FIG. 3 is provided as an example. Other examples may differ from what is described with regard to FIG. 3.

FIG. 4 is a diagram illustrating an example 400 of an SRS resource set, in accordance with the present disclosure.

An SRS resource set may be associated with a plurality of parameters, such as RRC parameters. The SRS resource set may be associated with an SRS resource set identifier parameter, which may indicate an identifier associated with the SRS resource set. The SRS resource set may be associated with an SRS resource identifier list parameter, which may indicate identifiers of SRS resources associated with the SRS resource set.

The SRS resource may be associated with a resource type parameter, which may be associated with an aperiodic resource type, a semi-persistent resource type, or a periodic resource type. The aperiodic resource type may be associated with an aperiodic SRS resource trigger, which may indicate a DCI code point at which a UE may transmit an SRS according to an SRS resource set configuration. The aperiodic resource type may be associated with a CSI-RS parameter, which may indicate an identifier of a CSI-RS resource associated with the SRS resource set. The aperiodic resource type may be associated with a slot offset parameter, which may indicate an offset in quantity of slots between a triggering DCI and an actual transmission of the SRS resource set. The aperiodic resource type may be associated with an aperiodic SRS resource trigger list, which may indicate an additional list of DCI code points at which the UE may transmit the SRS according to the SRS resource set configuration. The semi-persistent resource type and the periodic resource type may each be associated with an associated CSI-RS parameter, which may indicate an identifier of a CSI-RS resource associated with the SRS resource set in a non-codebook based operation.

The SRS resource may be associated with a usage parameter, which may indicate whether the SRS resource set is used for beam management, a codebook based or non-codebook based transmission, or antenna switching. The SRS resource may be associated with an alpha parameter, which may indicate an alpha value for an SRS power control. The SRS resource may be associated with a P0 parameter, which may indicate a P0 value for the SRS power control. The SRS resource may be associated with a pathloss reference signal parameter, which may indicate a reference signal (e.g., a CSI-RS configuration or a synchronization signal block) to be used for SRS pathloss estimation. The SRS resource may be associated with an SRS power control adjustment states parameter, which indicates values corresponding to whether two PUSCH power control adjustment states are configured or whether a separate closed loop is configured for SRS.

As indicated above, FIG. 4 is provided as an example. Other examples may differ from what is described with regard to FIG. 4.

The bit width of the SRI in DCI format 0_2 may be based at least in part on the srs-ResourceSetToAddModListDCI-0-2-r16 parameter. The bit width of the SRI may be $$\left\lceil \log_2\left(\sum_{k=1}^{\min\{L_{max}, N_{SRS,0\_2}\}} \binom{N_{SRS,0\_2}}{k}\right)\right\rceil$$

or $\lceil \log_2 N_{SRS,0\_2} \rceil$ bits, where $N_{SRS,0\_2}$ indicates a quantity of configured SRS resources in an SRS resource set configured by the srs-ResourceSetToAddModListDCI-0-2 parameter, and may be associated with a higher layer parameter usage of value "codebook" or "non-codebook". The SRS resource set may be composed of a first $N_{SRS,0\_2}$ SRS resources together with other configurations in the SRS resource set configured by the srs-ResourceSetToAddModList parameter, if any, and may be associated with the higher layer parameter usage of value "codebook" or "non-codebook", respectively.

The bit width of the SRI in DCI format 0_2 may be $$\left\lceil \log_2\left(\sum_{k=1}^{\min\{L_{max}, N_{SRS,0\_2}\}} \binom{N_{SRS,0\_2}}{k}\right)\right\rceil$$

bits when a higher layer parameter txConfig is set to "non-codebook", where $N_{SRS,0\_2}$ is the quantity of configured SRS resources in the SRS resource set configured by the srs-ResourceSetToAddModListDCI-0-2 parameter, and may be associated with the higher layer parameter usage of value "non-codebook", where the SRS resource set may be composed of the first $N_{SRS,0\_2}$ SRS resources together with other configurations in the SRS resource set configured by the srs-ResourceSetToAddModList parameter, if any, and may be associated with the higher layer parameter usage of value "non-codebook".

The bit width of the SRI in DCI format 0_2 may be $\lceil \log_2 N_{SRS,0\_2} \rceil$ bits when the higher layer parameter txConfig is set to "codebook", where $N_{SRS,0\_2}$ is the quantity of configured SRS resources in the SRS resource set configured by the srs-ResourceSetToAddModListDCI-0-2 parameter, and may be associated with the higher layer parameter usage of value "codebook", where the SRS resource set may be composed of the first $N_{SRS,0\_2}$ SRS resources together with other configurations in the SRS resource set configured by the srs-ResourceSetToAddModList parameter, if any, and may be associated with the higher layer parameter usage of value "codebook".

A UE may be configured with at most one SRS resource set with a usage set to "codebook" and one SRS resource set with a usage set to "non-codebook" in the srs-ResourceSetToAddModList parameter. However, with the srs-ResourceSetToAddModListDCI-0-2 parameter, the UE would need to support at most one additional SRS resource set with the usage set to "codebook" and one additional SRS resource set with the usage set to "non-codebook". An objective of the srs-ResourceSetToAddModListDCI-0-2 parameter was to enable a container (e.g., a second SRS resource set) that contains a subset of SRS resources in the SRS resource set configured in the srs-ResourceSetToAddModList parameter with the usage set to "codebook", and similarly for the usage set to "non-codebook".

As a result, in a previous design, SRS resources in the SRS resource set indicated in the srs-ResourceSetToAddModListDCI-0-2 parameter with the usage set to "codebook" only contained a first X SRS resources in the SRS resource set in the srs-ResourceSetToAddModList parameter with the usage set to "codebook". Further, a plurality of RRC parameters associated with a first SRS resource set was set to be equal to a plurality of RRC parameters associated with a second resource set (if the second SRS resource set was configured). However, restricting RRC parameters (e.g., all RRC parameters) to being equal across two SRS resource sets was unnecessarily limiting and increased a UE processing complexity.

In various aspects of techniques and apparatuses described herein, a UE may receive, from a network entity, a first SRS resource set configuration that indicates a first set of parameters. The UE may receive, from the network entity, a second SRS resource set configuration with a same usage (e.g., codebook or non-codebook) as the first SRS resource set configuration that indicates a second set of parameters. The first SRS resource set configuration may be associated with a first SRS resource set, and the second SRS resource set configuration may be associated with a second SRS resource set. A first subset of parameters may be the same between the first set of parameters and the second set of parameters, and a second subset of parameters may be different between the first set of parameters and the second set of parameters. The parameters may be RRC parameters. The UE may determine which parameters may be different between the two SRS resource sets, and the UE may determine which parameters are the same between the two SRS resource sets to avoid UE processing complexity. In other words, the UE may determine associations between the two SRS resource sets, which may be configured by the first and second SRS resource set configurations, respectively, in order to reduce the UE processing complexity.

As indicated above, FIG. 4 is provided as an example. Other examples may differ from what is described with regard to FIG. 4.

Figure 5:
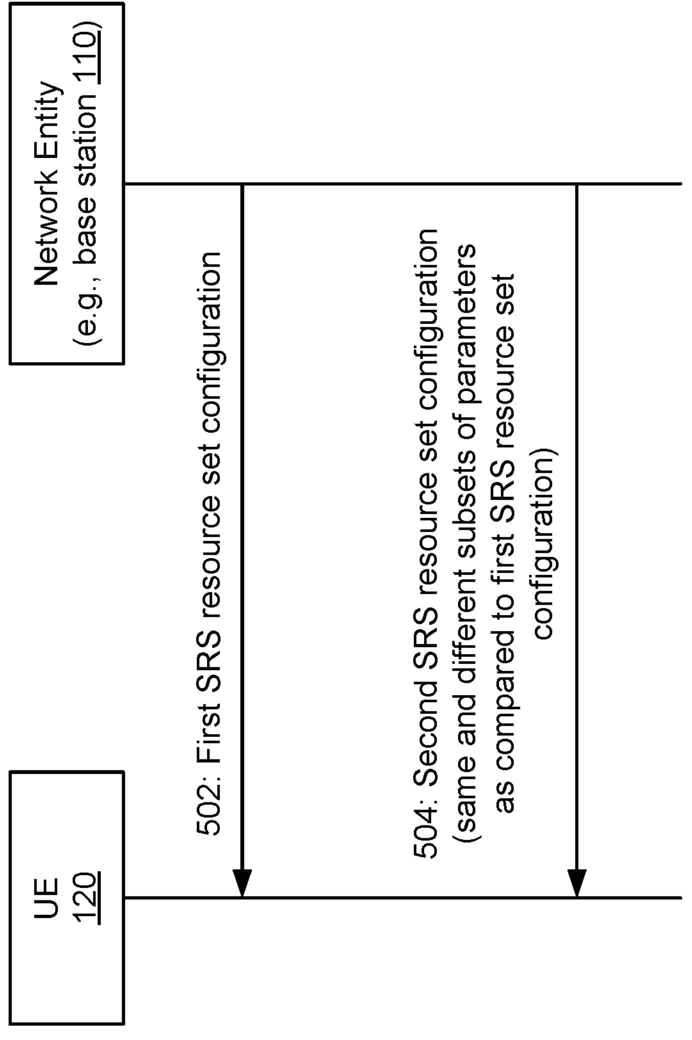
FIG. 5 is a diagram illustrating an example associated with SRS resource set configurations, in accordance with the present disclosure.

FIG. 5 is a diagram illustrating an example 500 associated with SRS resource set configurations, in accordance with the present disclosure. As shown in FIG. 5, example 500 includes communication between a UE (e.g., UE 120) and a network entity (e.g., base station 110). In some aspects, the UE and the network entity may be included in a wireless network, such as wireless network 100.

As shown by reference number 502, the UE may receive, from the network entity, a first SRS resource set configuration that indicates a first set of parameters. The first SRS resource set configuration may be associated with format 0_1 or DCI format 1_1. The first SRS resource set configuration may be associated with a first SRS resource set. The first SRS resource set configuration may be associated with an "SRS resource set to add or modify list" (srs-ResourceSetToAddModList) parameter.

As shown by reference number 504, the UE may receive, from the network entity, a second SRS resource set configuration with a same usage as the first SRS resource set configuration that indicates a second set of parameters. The same usage between the first SRS resource set configuration and the second SRS resource configuration may be a codebook usage. Alternatively, the same usage between the first SRS resource set configuration and the second SRS resource configuration may be a non-codebook usage. The second SRS resource set configuration is associated with DCI format 0_2 or DCI format 1_2. The second SRS resource set configuration may be associated with a second SRS resource set used for URLLC. The second SRS resource set configuration may be associated with an "SRS resource set to add or modify list for DCI format 0_2" (srs-ResourceSetToAddModListDCI-0-2) parameter.

In some aspects, a first subset of parameters may be the same between the first set of parameters and the second set of parameters and a second subset of parameters may be different between the first set of parameters and the second set of parameters. The first subset of parameters may indicate a resource type including an aperiodic resource type, a periodic resource type, or a semi-persistent resource type. The first subset of parameters may indicate a CSI-RS for an aperiodic SRS or an associated CSI-RS for a periodic SRS and a semi-persistent SRS. The first subset of parameters may indicate power control parameters including an alpha value, a nominal power value, a pathloss reference signal, or SRS power control adjustment states. The first subset of parameters may indicate a slot offset. The first subset of parameters may indicate a pathloss reference signal list. The second subset of parameters may indicate a slot offset. The second subset of parameters may indicate an SRS resource identifier list. The second subset of parameters may indicate an aperiodic SRS resource trigger that triggers an aperiodic SRS transmission. The second subset of parameters may indicate an aperiodic SRS resource trigger list. The second subset of parameters may indicate an SRS resource set identifier.

In some aspects, certain parameters may be configured via RRC signaling to be the same between two SRS resource sets with the same usage (e.g., codebook or non-codebook). The parameters may include a resource type (e.g., aperiodic, periodic, or semi-persistent). The parameters may include a CSI-RS for an aperiodic SRS, or an associated CSI-RS for a periodic or semi-persistent SRS. The parameters may include alpha, p0, a pathloss reference signal (pathlossreferenceRS), and/or SRS power control adjustment states (SRS-PowerControlAdjustmentStates). The parameters may include a pathloss reference signal list (pathlossReferenceRSList-r16). The parameters may include a slot offset. In other words, the slot offset may be the same between the two SRS resource sets, or the slot offset may be different between the two SRS resource sets.

In some aspects, certain parameters may be configured via RRC signaling to be different between the two SRS resource sets with the same usage (e.g., codebook or non-codebook). The parameters may include a slot offset. When an SRS resource set defined by the srs-ResourceSetToAddModListDCI-0-2 parameter is for an URLLC use case, different slot offsets may be assigned for SRS resources in the two SRS resource sets, which may provide the network entity flexibility to configure the slot offset without increasing a UE processing burden. The parameters may include an aperiodic SRS resource trigger (AperiodicSRS-ResourceTrigger), which may be used in DCI format 1_2 and DCI format 0_2 (or DCI format 1_1 and DCI format 01) to trigger an aperiodic SRS transmission. Since the aperiodic SRS resource trigger may be associated with different DCI formats, the aperiodic SRS resource trigger may not be configured the same between the two SRS resource sets. The parameters may include an aperiodic SRS resource trigger list (AperiodicSRS-ResourceTriggerList). Since the aperiodic SRS resource trigger list may be associated with different DCI formats, the aperiodic SRS resource trigger list may not be configured the same between the two SRS resource sets.

In some aspects, certain parameters may be configured via RRC signaling to be different between the two SRS resource sets with the same usage (e.g., codebook or non-codebook). In some cases, such parameters must be different between the two SRS resource sets with the same usage. The parameters may include an SRS resource set identifier (Srs-ResourceSetId), since the two SRS resource sets are different and cannot use the same SRS resource set identifier.

As indicated above, FIG. 5 is provided as an example. Other examples may differ from what is described with regard to FIG. 5.

FIG. 6 is a diagram illustrating an example process 600 performed, for example, by a UE, in accordance with the present disclosure. Example process 600 is an example where the UE (e.g., UE 120) performs operations associated with SRS resource set configurations.

As shown in FIG. 6, in some aspects, process 600 may include receiving, from a network entity, a first SRS resource set configuration that indicates a first set of parameters (block 610). For example, the UE (e.g., using reception component 802, depicted in FIG. 8) may receive, from a network entity, a first SRS resource set configuration that indicates a first set of parameters, as described above.

As further shown in FIG. 6, in some aspects, process 600 may include receiving, from the network entity, a second SRS resource set configuration with a same usage as the first SRS resource set configuration that indicates a second set of parameters, wherein a first subset of parameters is the same between the first set of parameters and the second set of parameters, and a second subset of parameters is different between the first set of parameters and the second set of parameters (block 620). For example, the UE (e.g., using reception component 802, depicted in FIG. 8) may receive, from the network entity, a second SRS resource set configuration with a same usage as the first SRS resource set configuration that indicates a second set of parameters, wherein a first subset of parameters is the same between the first set of parameters and the second set of parameters, and a second subset of parameters is different between the first set of parameters and the second set of parameters, as described above.

Process 600 may include additional aspects, such as any single aspect or any combination of aspects described below and/or in connection with one or more other processes described elsewhere herein.

In a first aspect, the same usage between the first SRS resource set configuration and the second SRS resource configuration is a codebook usage.

In a second aspect, alone or in combination with the first aspect, the same usage between the first SRS resource set configuration and the second SRS resource configuration is a non-codebook usage.

In a third aspect, alone or in combination with one or more of the first and second aspects, the first subset of parameters that is the same between the first set of parameters and the second set of parameters indicates one or more of a resource type including an aperiodic resource type, a periodic resource type, or a semi-persistent resource type, a CSI-RS for an aperiodic SRS or an associated CSI-RS for a periodic SRS and a semi-persistent SRS, power control parameters including an alpha value, a nominal power value, a pathloss reference signal, or SRS power control adjustment states, a slot offset, or a pathloss reference signal list.

In a fourth aspect, alone or in combination with one or more of the first through third aspects, the second subset of parameters that is different between the first set of parameters and the second set of parameters indicates one or more of a slot offset, an SRS resource identifier list, an aperiodic SRS resource trigger that triggers an aperiodic SRS transmission, an aperiodic SRS resource trigger list, or an SRS resource set identifier.

In a fifth aspect, alone or in combination with one or more of the first through fourth aspects, the first SRS resource set configuration is associated with DCI format 0_1 or DCI format 1_1, and the second SRS resource set configuration is associated with DCI format 0_2 or DCI format 1_2.

In a sixth aspect, alone or in combination with one or more of the first through fifth aspects, the first SRS resource set configuration is associated with a first SRS resource set, and the second SRS resource set configuration is associated with a second SRS resource set.

In a seventh aspect, alone or in combination with one or more of the first through sixth aspects, the first SRS resource set configuration is associated with an "SRS resource set to add or modify list" parameter, and the second SRS resource set configuration is associated with an "SRS resource set to add or modify list for downlink control information format 0_2" parameter.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
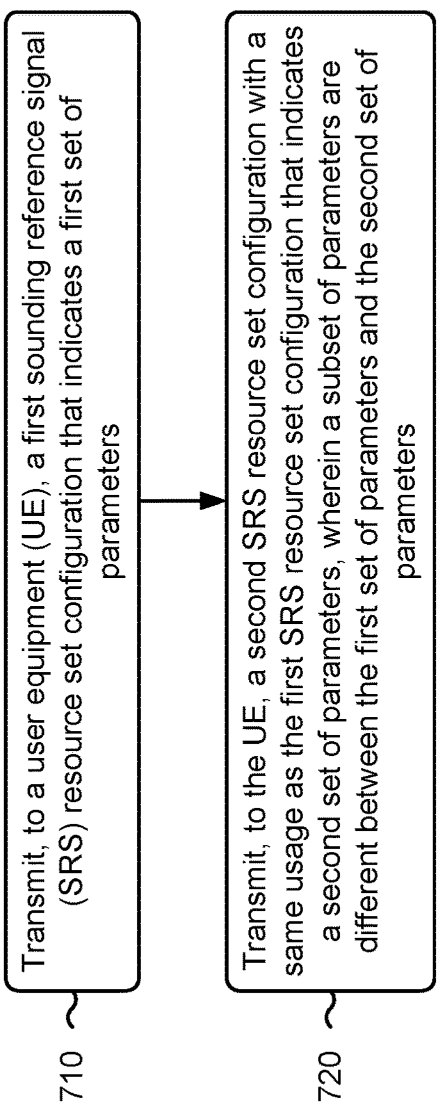

FIG. 7 is a diagram illustrating an example process 700 performed, for example, by a network entity, in accordance with the present disclosure. Example process 700 is an example where the network entity (e.g., base station 110) performs operations associated with SRS resource set configurations.

As shown in FIG. 7, in some aspects, process 700 may include transmitting, to a UE, a first SRS resource set configuration that indicates a first set of parameters (block 710). For example, the network entity (e.g., using transmission component 904, depicted in FIG. 9) may transmit, to a UE, a first SRS resource set configuration that indicates a first set of parameters, as described above.

As further shown in FIG. 7, in some aspects, process 700 may include transmitting, to the UE, a second SRS resource set configuration with a same usage as the first SRS resource set configuration that indicates a second set of parameters, wherein a first subset of parameters is the same between the first set of parameters and the second set of parameters, and a second subset of parameters is different between the first set of parameters and the second set of parameters (block 720). For example, the network entity (e.g., using transmission component 904, depicted in FIG. 9) may transmit, to the UE, a second SRS resource set configuration with a same usage as the first SRS resource set configuration that indicates a second set of parameters, wherein a first subset of parameters is the same between the first set of parameters and the second set of parameters, and a second subset of parameters is different between the first set of parameters and the second set of parameters, as described above.

Process 700 may include additional aspects, such as any single aspect or any combination of aspects described below and/or in connection with one or more other processes described elsewhere herein.

In a first aspect, the same usage between the first SRS resource set configuration and the second SRS resource configuration is a codebook usage.

In a second aspect, alone or in combination with the first aspect, the same usage between the first SRS resource set configuration and the second SRS resource configuration is a non-codebook usage.

In a third aspect, alone or in combination with one or more of the first and second aspects, the first subset of parameters that is the same between the first set of parameters and the second set of parameters indicates one or more of a resource type including an aperiodic resource type, a periodic resource type, or a semi-persistent resource type, a CSI-RS for an aperiodic SRS or an associated CSI-RS for a periodic SRS and a semi-persistent SRS, power control parameters including an alpha value, a nominal power value, a pathloss reference signal, or SRS power control adjustment states, a slot offset, or a pathloss reference signal list.

In a fourth aspect, alone or in combination with one or more of the first through third aspects, the second subset of parameters that is different between the first set of parameters and the second set of parameters indicates one or more of a slot offset, an SRS resource identifier list, an aperiodic SRS resource trigger that triggers an aperiodic SRS transmission, an aperiodic SRS resource trigger list, or an SRS resource set identifier.

In a fifth aspect, alone or in combination with one or more of the first through fourth aspects, the first SRS resource set configuration is associated with DCI format 0_1 or DCI format 1_1, and the second SRS resource set configuration is associated with DCI format 0_2 or DCI format 1_2.

In a sixth aspect, alone or in combination with one or more of the first through fifth aspects, the first SRS resource set configuration is associated with a first SRS resource set, and the second SRS resource set configuration is associated with a second SRS resource set.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
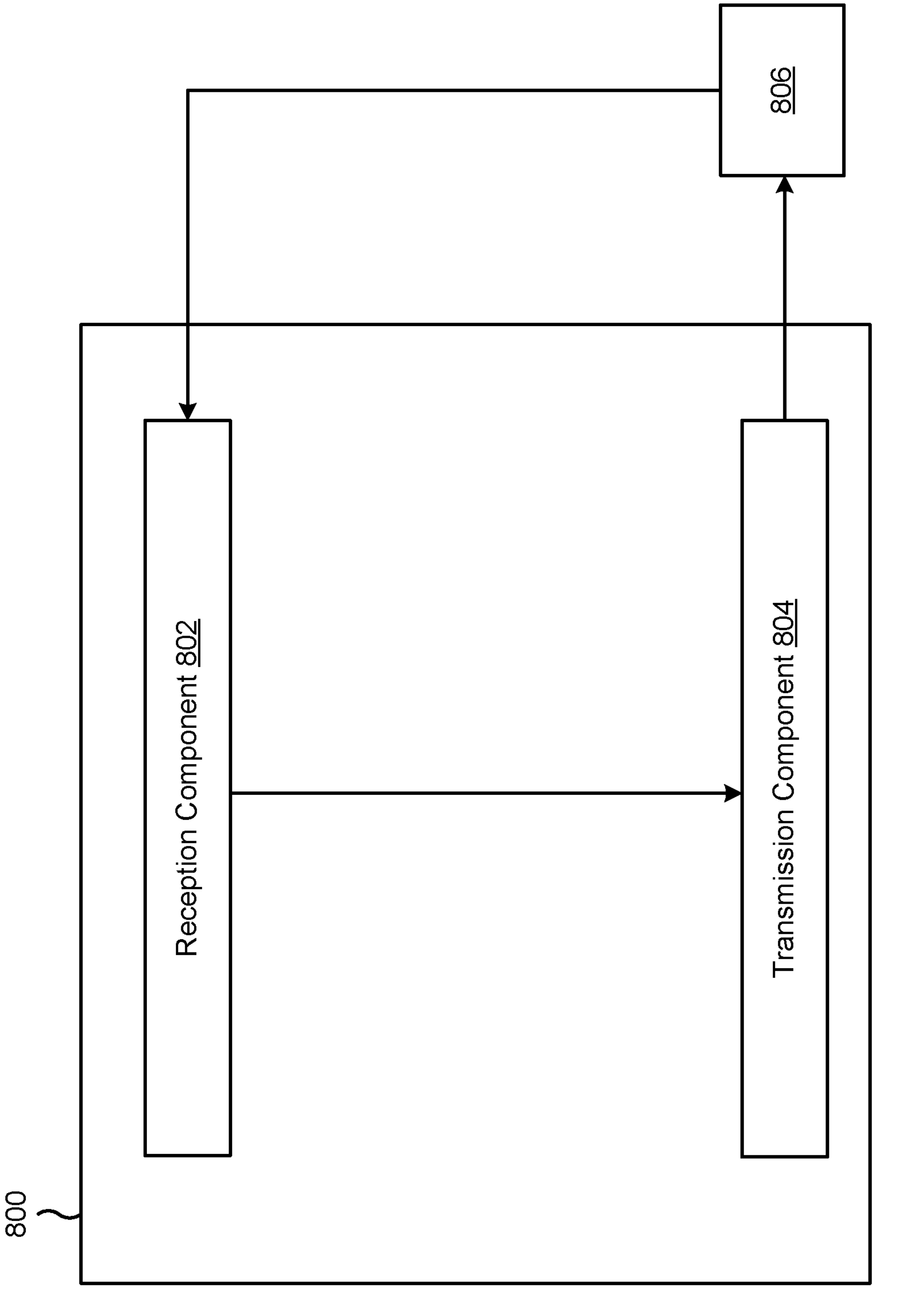
FIGS. 8-9 are diagrams of example apparatuses for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive, from a network entity, a first SRS resource set configuration that indicates a first set of parameters. The reception component 802 may receive, from the network entity, a second SRS resource set configuration with a same usage as the first SRS resource set configuration that indicates a second set of parameters, wherein a first subset of parameters is the same between the first set of parameters and the second set of parameters, and a second subset of parameters is different between the first set of parameters and the second set of parameters.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
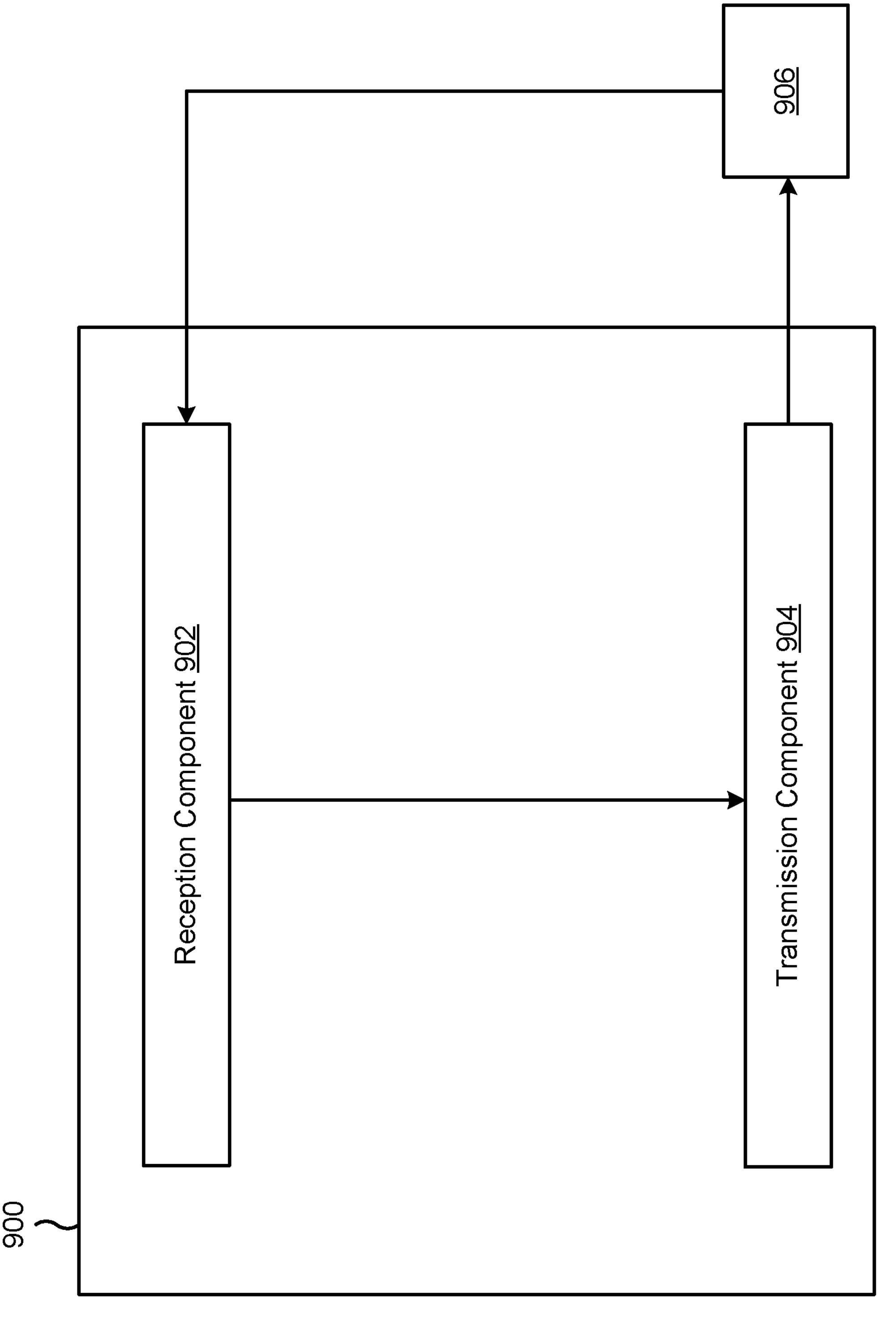

FIG. 9 is a diagram of an example apparatus 900 for wireless communication. The apparatus 900 may be a network entity, or a network entity may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The transmission component 904 may transmit, to a UE, a first SRS resource set configuration that indicates a first set of parameters. The transmission component 904 may transmit, to the UE, a second SRS resource set configuration with a same usage as the first SRS resource set configuration that indicates a second set of parameters, wherein a first subset of parameters is the same between the first set of parameters and the second set of parameters, and a second subset of parameters is different between the first set of parameters and the second set of parameters.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
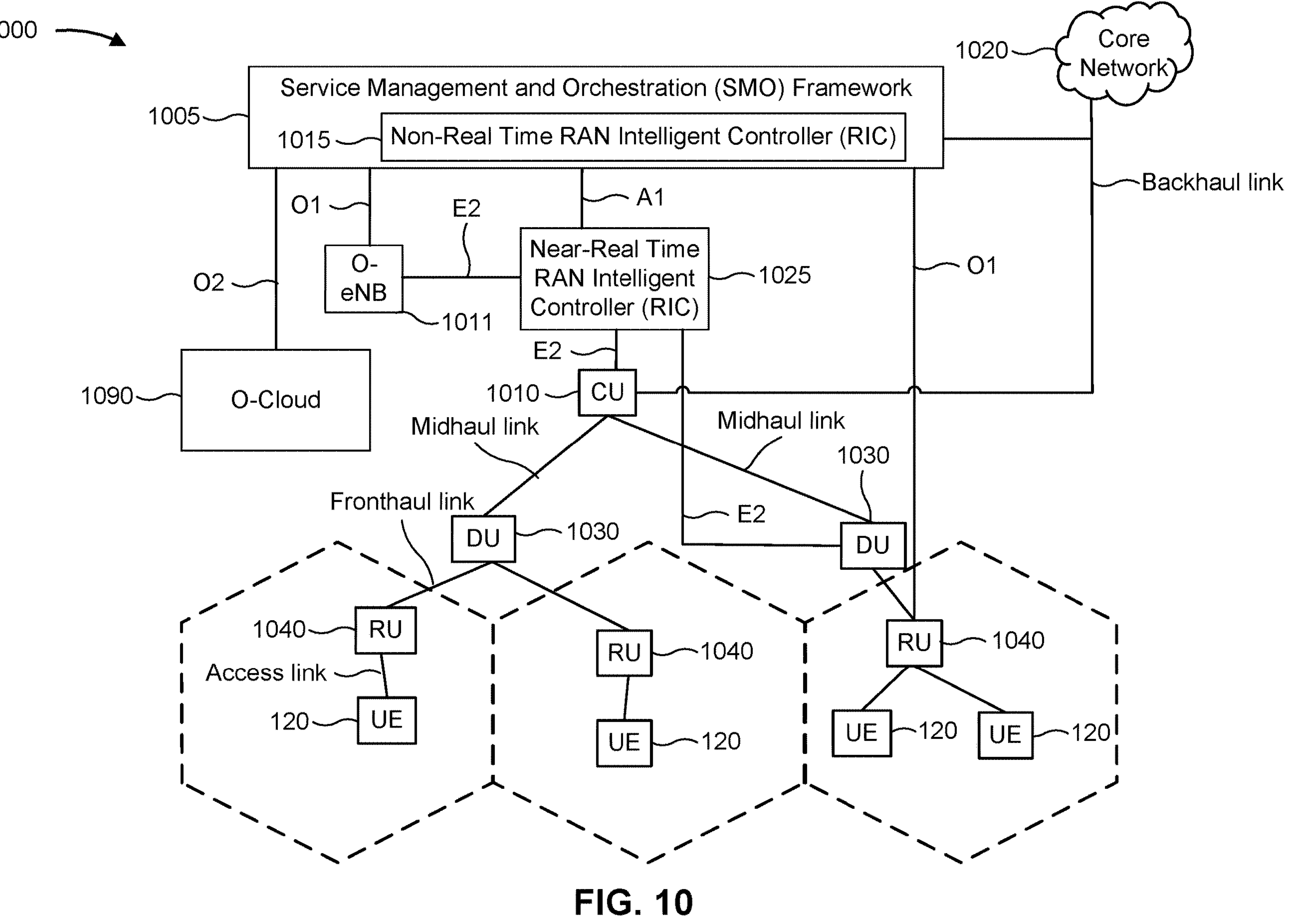
FIG. 10 is a diagram illustrating an example of a disaggregated base station architecture, in accordance with the present disclosure.

FIG. 10 is a diagram illustrating an example 1000 of a disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (e.g., a virtual centralized unit (VCU), a virtual distributed unit (VDU), or a virtual radio unit (VRU)).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 10 may include one or more CUs 1010 that can communicate directly with a core network 1020 via a backhaul link, or indirectly with the core network 1020 through one or more disaggregated base station units (such as a Near-RT RIC 1025 via an E2 link, or a Non-RT RIC 1015 associated with a Service Management and Orchestration (SMO) Framework 1005, or both). A CU 1010 may communicate with one or more DUs 1030 via respective midhaul links, such as an F1 interface. The DUs 1030 may communicate with one or more RUs 1040 via respective fronthaul links. The RUs 1040 may communicate with respective UEs 120 via one or more radio frequency (RF) access links. In some implementations, the UE 120 may be simultaneously served by multiple RUs 1040.

Each of the units (e.g., the CUs 1010, the DUs 1030, the RUs 1040), as well as the Near-RT RICs 1025, the Non-RT RICs 1015, and the SMO Framework 1005, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 1010 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 1010. The CU 1010 may be configured to handle user plane functionality (e.g., Central Unit-User Plane (CU-UP)), control plane functionality (e.g., Central Unit-Control Plane (CU-CP)), or a combination thereof. In some implementations, the CU 1010 can be logically split into one or more CU-UP units and one or more CU-CP units. The CU-UP unit can communicate bidirectionally with the CU-CP unit via an interface, such as the E1 interface when implemented in an O-RAN configuration. The CU 1010 can be implemented to communicate with the DU 1030, as necessary, for network control and signaling.

The DU 1030 may correspond to a logical unit that includes one or more base station functions to control the operation of one or more RUs 1040. In some aspects, the DU 1030 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 1030 may further host one or more low-PHY layers. Each layer (or module) can be implemented with an interface configured to communicate signals with other layers (and modules) hosted by the DU 1030, or with the control functions hosted by the CU 1010.

Lower-layer functionality can be implemented by one or more RUs 1040. In some deployments, an RU 1040, controlled by a DU 1030, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1040 can be implemented to handle over the air (OTA) communication with one or more UEs 120. In some implementations, real-time and non-real-time aspects of control and user plane communication with the RU(s) 1040 can be controlled by the corresponding DU 1030. In some scenarios, this configuration can enable the DU(s) 1030 and the CU 1010 to be implemented in a cloud-based RAN architecture, such as a vRAN architecture.

The SMO Framework 1005 may be configured to support RAN deployment and provisioning of non-virtualized and virtualized network elements. For non-virtualized network elements, the SMO Framework 1005 may be configured to support the deployment of dedicated physical resources for RAN coverage requirements which may be managed via an operations and maintenance interface (such as an O1 interface). For virtualized network elements, the SMO Framework 1005 may be configured to interact with a cloud computing platform (such as an open cloud (O-Cloud) 1090) to perform network element life cycle management (such as to instantiate virtualized network elements) via a cloud computing platform interface (such as an O2 interface). Such virtualized network elements can include, but are not limited to, CUs 1010, DUs 1030, RUs 1040 and Near-RT RICs 1025. In some implementations, the SMO Framework 1005 can communicate with a hardware aspect of a 4G RAN, such as an open eNB (O-eNB) 1011, via an O1 interface. Additionally, in some implementations, the SMO Framework 1005 can communicate directly with one or more RUs 1040 via an O1 interface. The SMO Framework 1005 also may include a Non-RT RIC 1015 configured to support functionality of the SMO Framework 1005.

The Non-RT RIC 1015 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1025. The Non-RT RIC 1015 may be coupled to or communicate with (such as via an A1 interface) the Near-RT RIC 1025. The Near-RT RIC 1025 may be configured to include a logical function that enables near-real-time control and optimization of RAN elements and resources via data collection and actions over an interface (such as via an E2 interface) connecting one or more CUs 1010, one or more DUs 1030, or both, as well as an O-eNB, with the Near-RT RIC 1025.

In some implementations, to generate AI/ML models to be deployed in the Near-RT RIC 1025, the Non-RT RIC 1015 may receive parameters or external enrichment information from external servers. Such information may be utilized by the Near-RT RIC 1025 and may be received at the SMO Framework 1005 or the Non-RT RIC 1015 from non-network data sources or from network functions. In some examples, the Non-RT RIC 1015 or the Near-RT RIC 1025 may be configured to tune RAN behavior or performance. For example, the Non-RT RIC 1015 may monitor long-term trends and patterns for performance and employ AI/ML models to perform corrective actions through the SMO Framework 1005 (such as reconfiguration via O1) or via creation of RAN management policies (such as A1 policies).

As indicated above, FIG. 10 is provided as an example. Other examples may differ from what is described with regard to FIG. 10.

The following provides an overview of some Aspects of the present disclosure:

Aspect 1: A method of wireless communication performed by a user equipment (UE), comprising: receiving, from a network entity, a first sounding reference signal (SRS) resource set configuration that indicates a first set of parameters; and receiving, from the network entity, a second SRS resource set configuration with a same usage as the first SRS resource set configuration that indicates a second set of parameters, wherein a subset of parameters are different between the first set of parameters and the second set of parameters.

Aspect 2: The method of Aspect 1, wherein the same usage between the first SRS resource set configuration and the second SRS resource configuration is a codebook usage.

Aspect 3: The method of any of Aspects 1 through 2, wherein the same usage between the first SRS resource set configuration and the second SRS resource configuration is a non-codebook usage.

Aspect 4: The method of any of Aspects 1 through 3, wherein the subset of parameters is a second subset of parameters, and wherein a first subset of parameters are the same between the first set of parameters and the second set of parameters and indicate one or more of: a resource type including an aperiodic resource type, a periodic resource type, or a semi-persistent resource type; a channel state information reference signal (CSI-RS) for an aperiodic SRS or an associated CSI-RS for a periodic SRS and a semi-persistent SRS; power control parameters including an alpha value, a nominal power value, a pathloss reference signal, or SRS power control adjustment states; a slot offset; or a pathloss reference signal list.

Aspect 5: The method of any of Aspects 1 through 4, wherein the subset of parameters that are different between the first set of parameters and the second set of parameters indicate one or more of: an SRS resource identifier list; or an SRS resource set identifier.

Aspect 6: The method of any of Aspects 1 through 5, wherein: the second SRS resource set configuration is associated with DCI format 0_2 or DCI format 1_2.

Aspect 7: The method of any of Aspects 1 through 6, wherein the first SRS resource set configuration is associated with a first SRS resource set, and wherein the second SRS resource set configuration is associated with a second SRS resource set.

Aspect 8: The method of any of Aspects 1 through 7, wherein the first SRS resource set configuration is associated with an "SRS resource set to add or modify list" parameter, and wherein the second SRS resource set configuration is associated with an "SRS resource set to add or modify list for downlink control information format 0_2" parameter.

Aspect 9: A method of wireless communication performed by a network entity, comprising: transmitting, to a user equipment (UE), a first sounding reference signal (SRS) resource set configuration that indicates a first set of parameters; and transmitting, to the UE, a second SRS resource set configuration with a same usage as the first SRS resource set configuration that indicates a second set of parameters, wherein a first subset of parameters is the same between the first set of parameters and the second set of parameters, and a second subset of parameters is different between the first set of parameters and the second set of parameters.

Aspect 10: The method of Aspect 9, wherein the same usage between the first SRS resource set configuration and the second SRS resource configuration is a codebook usage.

Aspect 11: The method of any of Aspects 9 through 10, wherein the same usage between the first SRS resource set configuration and the second SRS resource configuration is a non-codebook usage.

Aspect 12: The method of any of Aspects 9 through 11, wherein the first subset of parameters that is the same between the first set of parameters and the second set of parameters indicates one or more of: a resource type including an aperiodic resource type, a periodic resource type, or a semi-persistent resource type; a channel state information reference signal (CSI-RS) for an aperiodic SRS or an associated CSI-RS for a periodic SRS and a semi-persistent SRS; power control parameters including an alpha value, a nominal power value, a pathloss reference signal, or SRS power control adjustment states; a slot offset; or a pathloss reference signal list.

Aspect 13: The method of any of Aspects 9 through 12, wherein the second subset of parameters that is different between the first set of parameters and the second set of parameters indicates one or more of: a slot offset; an SRS resource identifier list; an aperiodic SRS resource trigger that triggers an aperiodic SRS transmission; an aperiodic SRS resource trigger list; or an SRS resource set identifier.

Aspect 14: The method of any of Aspects 9 through 13, wherein: the first SRS resource set configuration is associated with downlink control information (DCI) format 0_1 or DCI format 1_1; and the second SRS resource set configuration is associated with DCI format 0_2 or DCI format 1_2.

Aspect 15: The method of any of Aspects 9 through 14, wherein the first SRS resource set configuration is associated with a first SRS resource set, and wherein the second SRS resource set configuration is associated with a second SRS resource set.

Aspect 16: An apparatus for wireless communication at a device, comprising a processor; memory coupled with the processor; and instructions stored in the memory and executable by the processor to cause the apparatus to perform the method of one or more of Aspects 1-8.

Aspect 17: A device for wireless communication, comprising a memory and one or more processors coupled to the memory, the one or more processors configured to perform the method of one or more of Aspects 1-8.

Aspect 18: An apparatus for wireless communication, comprising at least one means for performing the method of one or more of Aspects 1-8.

Aspect 19: A non-transitory computer-readable medium storing code for wireless communication, the code comprising instructions executable by a processor to perform the method of one or more of Aspects 1-8.

Aspect 20: A non-transitory computer-readable medium storing a set of instructions for wireless communication, the set of instructions comprising one or more instructions that, when executed by one or more processors of a device, cause the device to perform the method of one or more of Aspects 1-8.

Aspect 21: An apparatus for wireless communication at a device, comprising a processor; memory coupled with the processor; and instructions stored in the memory and executable by the processor to cause the apparatus to perform the method of one or more of Aspects 9-15.

Aspect 22: A device for wireless communication, comprising a memory and one or more processors coupled to the memory, the one or more processors configured to perform the method of one or more of Aspects 9-15.

Aspect 23: An apparatus for wireless communication, comprising at least one means for performing the method of one or more of Aspects 9-15.

Aspect 24: A non-transitory computer-readable medium storing code for wireless communication, the code comprising instructions executable by a processor to perform the method of one or more of Aspects 9-15.

Aspect 25: A non-transitory computer-readable medium storing a set of instructions for wireless communication, the set of instructions comprising one or more instructions that, when executed by one or more processors of a device, cause the device to perform the method of one or more of Aspects 9-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:

one or more memories; and one or more processors, coupled to the one or more memories, configured to:

receive, from a network entity, a first sounding reference signal (SRS) resource set configuration that indicates a first set of parameters; and receive, from the network entity, a second SRS resource set configuration that indicates a second set of parameters, wherein the second SRS resource set configuration is associated with DCI format 0_2 or DCI format 1_2, wherein a subset of parameters is different between the first set of parameters and the second set of parameters, and wherein the subset of parameters that is different between the first set of parameters and the second set of parameters indicate one or more of:

an SRS resource identifier list; or an SRS resource set identifier.

2. The apparatus of claim 1, wherein a codebook usage is the same between the first SRS resource set configuration and the second SRS resource configuration.

3. The apparatus of claim 1, wherein a non-codebook usage is the same between the first SRS resource set configuration and the second SRS resource configuration.

4. The apparatus of claim 1, wherein the subset of parameters is a second subset of parameters, and wherein a first subset of parameters are the same between the first set of parameters and the second set of parameters and indicate one or more of:

a resource type including an aperiodic resource type, a periodic resource type, or a semi-persistent resource type;

a channel state information reference signal (CSI-RS) for an aperiodic SRS or an associated CSI-RS for a periodic SRS and a semi-persistent SRS;

power control parameters including an alpha value, a nominal power value, a pathloss reference signal, or SRS power control adjustment states;

a slot offset; or a pathloss reference signal list.

5. The apparatus of claim 1, wherein the first SRS resource set configuration is associated with a first downlink control information (DCI) format.

6. The apparatus of claim 1, wherein the first SRS resource set configuration is associated with a first SRS resource set, and wherein the second SRS resource set configuration is associated with a second SRS resource set.

7. The apparatus of claim 1, wherein the first SRS resource set configuration is associated with an SRS resource set to add or modify list parameter, and wherein the second SRS resource set configuration is associated with an SRS resource set to add or modify list for downlink control information format 0_2 parameter.

8. An apparatus for wireless communication at a network entity, comprising:

one or more memories; and one or more processors, coupled to the one or more memories, configured to:

transmit, to a user equipment (UE), a first sounding reference signal (SRS) resource set configuration that indicates a first set of parameters; and transmit, to the UE, a second SRS resource set configuration that indicates a second set of parameters, wherein the second SRS resource set configuration is associated with DCI format 0_2 or DCI format 1_2, wherein a first subset of parameters is the same between the first set of parameters and the second set of parameters, and a second subset of parameters is different between the first set of parameters and the second set of parameters, and wherein the second subset of parameters that is different between the first set of parameters and the second set of parameters indicate one or more of:

an SRS resource identifier list; or an SRS resource set identifier.

9. The apparatus of claim 8, wherein a codebook usage is the same between the first SRS resource set configuration and the second SRS resource configuration.

10. The apparatus of claim 8, wherein a non-codebook usage is the same between the first SRS resource set configuration and the second SRS resource configuration.

11. The apparatus of claim 8, wherein the first subset of parameters that is the same between the first set of parameters and the second set of parameters indicates one or more of:

a resource type including an aperiodic resource type, a periodic resource type, or a semi-persistent resource type;

a channel state information reference signal (CSI-RS) for an aperiodic SRS or an associated CSI-RS for a periodic SRS and a semi-persistent SRS;

power control parameters including an alpha value, a nominal power value, a pathloss reference signal, or SRS power control adjustment states;

a slot offset; or a pathloss reference signal list.

12. The apparatus of claim 8, wherein the second subset of parameters that is different between the first set of parameters and the second set of parameters further indicates one or more of:

a slot offset;

an aperiodic SRS resource trigger that triggers an aperiodic SRS transmission; or an aperiodic SRS resource trigger list.

13. The apparatus of claim 8, wherein the first SRS resource set configuration is associated with downlink control information (DCI) format 0_1 or DCI format 1_1.

14. The apparatus of claim 8, wherein the first SRS resource set configuration is associated with a first SRS resource set, and wherein the second SRS resource set configuration is associated with a second SRS resource set.

15. A method of wireless communication performed by a user equipment (UE), comprising:

receiving, from a network entity, a first sounding reference signal (SRS) resource set configuration that indicates a first set of parameters; and receiving, from the network entity, a second SRS resource set configuration that indicates a second set of parameters, wherein the second SRS resource set configuration is associated with DCI format 0_2 or DCI format 1_2, wherein a first subset of parameters is the same between the first set of parameters and the second set of parameters, and a second subset of parameters is different between the first set of parameters and the second set of parameters, and wherein the second subset of parameters that is different between the first set of parameters and the second set of parameters indicate one or more of:

an SRS resource identifier list; or an SRS resource set identifier.

16. The method of claim 15, wherein a codebook usage is the same between the first SRS resource set configuration and the second SRS resource configuration.

17. The method of claim 15, wherein a non-codebook usage is the same between the first SRS resource set configuration and the second SRS resource configuration.

18. The method of claim 15, wherein the first subset of parameters that is the same between the first set of parameters and the second set of parameters indicates one or more of:

a resource type including an aperiodic resource type, a periodic resource type, or a semi-persistent resource type;

a channel state information reference signal (CSI-RS) for an aperiodic SRS or an associated CSI-RS for a periodic SRS and a semi-persistent SRS;

power control parameters including an alpha value, a nominal power value, a pathloss reference signal, or SRS power control adjustment states;

a slot offset; or a pathloss reference signal list.

19. The method of claim 15, wherein the second subset of parameters that is different between the first set of parameters and the second set of parameters further indicates one or more of:

a slot offset;

an aperiodic SRS resource trigger that triggers an aperiodic SRS transmission; or an aperiodic SRS resource trigger list.

20. The method of claim 15, wherein the first SRS resource set configuration is associated with downlink control information (DCI) format 0_1 or DCI format 1_1.

21. The method of claim 15, wherein the first SRS resource set configuration is associated with a first SRS resource set, and wherein the second SRS resource set configuration is associated with a second SRS resource set.

22. The method of claim 15, wherein the first SRS resource set configuration is associated with an SRS resource set to add or modify list parameter, and wherein the second SRS resource set configuration is associated with an SRS resource set to add or modify list for downlink control information format 0_2 parameter.

23. A method of wireless communication performed by a network entity, comprising:

transmitting, to a user equipment (UE), a first sounding reference signal (SRS) resource set configuration that indicates a first set of parameters; and transmitting, to the UE, a second SRS resource set configuration that indicates a second set of parameters, wherein the second SRS resource set configuration is associated with DCI format 0_2 or DCI format 1_2, wherein a first subset of parameters is the same between the first set of parameters and the second set of parameters, and a second subset of parameters is different between the first set of parameters and the second set of parameters, and wherein the second subset of parameters that is different between the first set of parameters and the second set of parameters indicate one or more of:

an SRS resource identifier list; or an SRS resource set identifier.

24. The method of claim 23, wherein a codebook usage is the same between the first SRS resource set configuration and the second SRS resource configuration.

25. The method of claim 23, wherein a non-codebook usage is the same between the first SRS resource set configuration and the second SRS resource configuration.

26. The method of claim 23, wherein the first subset of parameters that is the same between the first set of parameters and the second set of parameters indicates one or more of:

a resource type including an aperiodic resource type, a periodic resource type, or a semi-persistent resource type;

a channel state information reference signal (CSI-RS) for an aperiodic SRS or an associated CSI-RS for a periodic SRS and a semi-persistent SRS;

power control parameters including an alpha value, a nominal power value, a pathloss reference signal, or SRS power control adjustment states;

a slot offset; or a pathloss reference signal list.

27. The method of claim 23, wherein the second subset of parameters that is different between the first set of parameters and the second set of parameters further indicates one or more of:

a slot offset;

an aperiodic SRS resource trigger that triggers an aperiodic SRS transmission; or an aperiodic SRS resource trigger list.

28. The method of claim 23, wherein the first SRS resource set configuration is associated with downlink control information (DCI) format 0_1 or DCI format 1_1.

29. The apparatus of claim 1, wherein the first SRS resource set configuration is associated with downlink control information (DCI) format 0_1 or DCI format 1_1.

30. The apparatus of claim 29, wherein the subset of parameters is a second subset of parameters, and wherein a first subset of parameters are the same between the first set of parameters and the second set of parameters.

* * * * *